(12) United States Patent
Beard

(10) Patent No.: US 8,147,732 B2
(45) Date of Patent: Apr. 3, 2012

(54) HIGHLY MICROPOROUS POLYMERS AND METHODS FOR PRODUCING AND USING THE SAME

(75) Inventor: Kirby W. Beard, Norristown, PA (US)

(73) Assignee: Porous Power Technologies, LLC, Lafayette, CO (US)

( * ) Notice: Subject to any disclaimer, the term of this patent is extended or adjusted under 35 U.S.C. 154(b) by 700 days.

(21) Appl. No.: 11/040,277

(22) Filed: Jan. 20, 2005

(65) Prior Publication Data

US 2006/0081530 A1   Apr. 20, 2006

Related U.S. Application Data

(60) Provisional application No. 60/537,005, filed on Jan. 20, 2004.

(51) Int. Cl.
B29C 65/00 (2006.01)
B29B 17/00 (2006.01)
B01D 39/00 (2006.01)

(52) U.S. Cl. ...................... 264/41; 264/348; 210/500.27

(58) Field of Classification Search ............ 210/500.27–500.43, 490; 438/315.5, 315.7; 264/41, 264/204–207, 490; 345.348; 527/27; 96/4, 96/10
See application file for complete search history.

(56) References Cited

U.S. PATENT DOCUMENTS

| | | | | |
|---|---|---|---|---|
| 4,867,881 A * | 9/1989 | Kinzer | ............ | 210/490 |
| 5,266,391 A * | 11/1993 | Donato et al. | ............ | 428/220 |
| 6,579,342 B2 * | 6/2003 | Wang et al. | ............ | 95/46 |
| 6,881,337 B2 * | 4/2005 | Meluch et al. | ............ | 210/500.41 |
| 6,884,375 B2 * | 4/2005 | Wang et al. | ............ | 264/41 |
| 7,166,544 B2 * | 1/2007 | Padhi et al. | ............ | 438/778 |
| 7,258,914 B2 * | 8/2007 | Morikawa et al. | ............ | 428/316.6 |
| 7,351,338 B2 * | 4/2008 | Tada et al. | ............ | 210/500.23 |
| 7,455,772 B2 * | 11/2008 | Tada et al. | ............ | 210/500.36 |

* cited by examiner

*Primary Examiner* — Ana Fortuna
(74) *Attorney, Agent, or Firm* — Lowe Graham Jones PLLC

(57) ABSTRACT

The present invention provides microporous polymers and methods for producing and using the same. In particular, microporous polymers of the present invention are highly porous as indicated by a Gurley air permeability flow rate of about 4 seconds or less per mL of air flow per 25 micron of microporous polymer thickness per square inch.

16 Claims, 1 Drawing Sheet

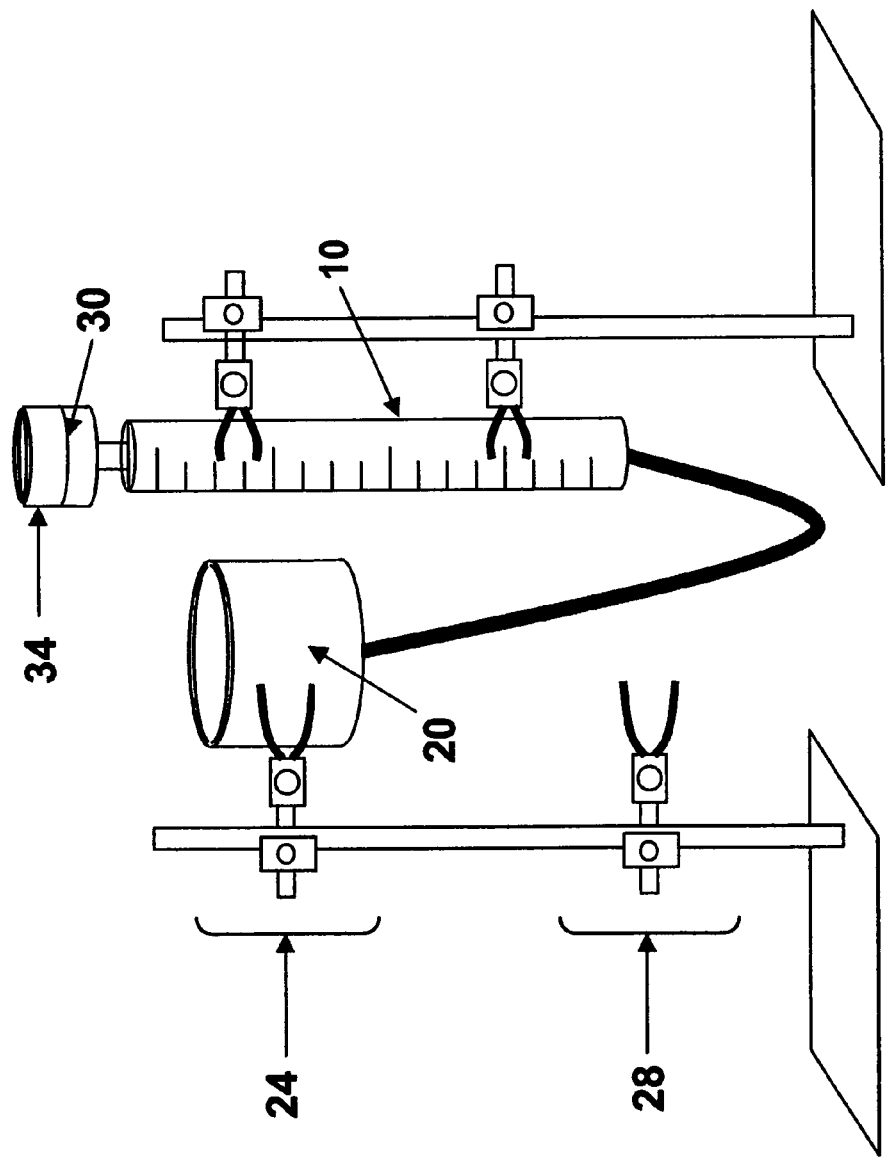

HIGHLY MICROPOROUS POLYMERS AND METHODS FOR PRODUCING AND USING THE SAME

CROSS-REFERENCE TO RELATED APPLICATIONS

This application claims the priority benefit of U.S. Provisional Application No. 60/537,005, filed Jan. 20, 2004, which is incorporated herein by reference in its entirety.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Grant No. N00164-04-C-6064 awarded by U.S. Navy.

FIELD OF THE INVENTION

The present invention relates to a microporous polymer, and methods for producing and using the same.

BACKGROUND OF THE INVENTION

Microporous polymers are polymers having pore sizes typically ranging from less than 1 micrometer (μm) to a few micrometers in diameter. Microporous polymers are useful in a variety of applications. For example, microporous polymers are often used in electronic devices (such as battery separators, capacitor separators, electrode binder materials, sensors, etc.), and as filtration materials (for example in separating gases, ions, and/or liquids), fabrics, mats, cloth, fibers (including hollow fibers), structural foams, and other applications that are well known to one skilled in the art.

Unfortunately the porosity, i.e., the amount of voids or interstitial space, of most conventional microporous polymers is limited, thereby reducing their usefulness. For example, batteries are used as an electricity source in a wide variety of applications. Batteries have an anode and a cathode that is separated by a separator (i.e., battery separator). The principal function of the battery separator is to prevent electrical conduction (i.e., "shorts") between the anode and the cathode while permitting ionic conduction via the electrolyte. The pores of the separator are filled with an ionically conductive electrolyte and allow migration of electrolyte from one electrode to another. Since the pores of battery separators are conduits of power, batteries having high porosity separator(s) provide a higher battery power and/or a longer battery life. In some cases, battery separators also need to provide good mechanical properties, e.g., in dry batteries, for winding and low electrical resistivity for device performance.

Therefore, there is a continuing effort to produce microporous polymers having a higher porosity and ionic conductivity.

BRIEF DESCRIPTION OF THE DRAWINGS

FIG. 1 illustrates an apparatus for measuring the porosity of a sample.

SUMMARY OF THE INVENTION

One aspect of the present invention provides a microporous polymer comprising:
(a) a first surface;
(b) a bulk matrix;
(c) a second surface; and
(d) a plurality of micropores extending from the first surface through the bulk matrix and to the second surface thereby providing a fluid communication between the first and second surfaces,
wherein the microporous polymer has a Gurley air permeability flow rate of about 4 seconds or less per mL of air flow per 25 microns of microporous polymer thickness per square inch of surface area.

Microporous polymers of the present invention are organic polymers. Accordingly, the composition of microporous polymers of the present invention comprises carbon and a group selected from hydrogen, halogen, oxygen, nitrogen, sulfur and a combination thereof. In one embodiment, the composition of the microporous polymer comprises halogen. Preferably, the halogen is selected from the group consisting of chloride, fluoride, and a mixture thereof.

In certain embodiments, the polymer of the present invention is selected from the group consisting of:
polyvinylidene fluoride, polyethylene, polyvinyl chloride, polyacrylonitrile, polymethyl methacrylate, polyvinylidene fluoride-hexafluoropropylene copolymer, ethylene-acrylic acid copolymer, ethylene-styrene copolymer, styrene-butadiene copolymer, styrene-isoprene copolymer, polydiene, polyalkane, polyacrylic, polyvinyl ether, polyvinyl alcohol, polyacetal, polyvinyl ketone, polyvinyl halide, polyvinyl nitril, polyvinyl ester, polystyrene, polyphenylene, polyoxide, polycarbonate, polyester, polyanhydride, polyurethane, polysulfonate, polysulfide, polysulfone, polyamide, and a mixture of two or more thereof.

In one particular embodiment, the polymer comprises polyvinylidene fluoride, polylvinylidene fluoride-hexafluoropropylene copolymer, polyvinyl chloride or a mixture thereof.

Yet in another embodiment, the polymer comprises at least about 80% polyvinylidene fluoride.

In another embodiment, the polymer is a semicrystalline polymer.

Another aspect of the present invention provides a method of producing a microporous polymer comprising:
forming a layer of a polymer solution on a substrate, wherein the polymer solution comprises a liquid and a polymer material that is dissolved in the liquid, and wherein the liquid comprises a high surface tension liquid;
producing a film of gelled polymer from the layer of polymer solution under conditions sufficient to provide a non-wetting, high surface tension solution within the layer of polymer solution; and
removing the liquid from the film of gelled polymer under conditions sufficient to produce the microporous polymer.

Preferably, the solubility of the polymer material in the liquid is about 20% v/v or less. Alternatively, the amount of polymer material dissolved in the polymer solution is at least near its saturation limit.

The polymer solution can be formed by admixing a liquid and the polymer material and heating the mixture and/or mixing the mixture using a high shear mixing to facilitate dissolving of the polymer material.

In one embodiment, at least the first 50% of the liquid in the gelled polymer is removed at a temperature near or below the temperature of said gelled polymer forming step.

Yet in another embodiment, the solubility of the polymer material in the solution is about 25% v/v or less relative to the total volume of the liquid in the solution.

While the liquid in the polymer solution can comprise entirely of the high surface tension liquid, in one particular embodiment, the liquid in the polymer solution further comprises a low surface tension liquid, preferably which is miscible with the high surface tension liquid. Preferably, the polymer material has a higher solubility in the low surface tension liquid than in the high surface tension liquid. In some embodiments, the low surface tension liquid has a higher vapor pressure than the higher surface tension liquid. In this manner, the low surface tension liquid evaporates at a faster rate than the high surface tension liquid from the polymer solution.

Still in another embodiment, the ratio of the low surface tension liquid relative to the high surface tension liquid is about 99:1 v/v or less.

Methods of the present invention can be used to produce microporous polymers where the void volume of the resulting microporous polymer is substantially similar or higher to the relative volumetric ratio between the high surface tension liquid and the combined volume total of the polymer material and the high surface tension liquid.

In one particular embodiment, the low surface tension liquid is a ketone, ester, ether, aldehyde, organic nitrogen compound, organic sulfur compound, or a mixture of two or more thereof. Preferably, the ketone is selected from the group consisting of acetone, methyl ethyl ketone, pentanone, hexanone, cyclic ketone, and a mixture of two or more thereof.

Yet in another embodiment, the high surface tension liquid is selected from the group consisting of:
acetamide, acetophenone, adiponitrile, aniline, benzaldehyde, benzyl benzoate, benzonitrile, benzophenone, bromine, bromobenzene, tribromomethane, bromophenol, carbon disulfide, chloroacetic acid, chlorobenzene, chlorophenol, diethylaniline, diethylene glycol, dimethylaniline, dimethyl phenyl pyrazolane, dimethyl sulfoxide, diphenylamine, ethylaniline, ethylene bromide, ethylene glycol, formamide, formic acid, furfural, γ-butyrolactone, glycerin, glycerol, methylaniline, methyl benzoate, methylene iodide, nitric acid, nitrobenzene, nitromethane, phenol, phosphorous tribromide, phosphorous tri-iodide, propylene glycol, pyridine, pyridazine, quinoline, sulfuric acid, tetrabromomethane, toluene, xylene, water, and a mixture of two or more thereof.

Preferably, the high surface tension liquid is water.

Still in another embodiment, the thickness of the polymer solution layer on the substrate is about 500 μm or less.

Yet in another embodiment, the substrate is a high surface energy substrate. Preferably, the surface energy of the substrate is at least about 40 dynes/cm at 25° C.

In one particular embodiment, the film of gelled polymer is formed at a temperature of about 40° C. or less.

In another embodiment, the liquid is removed from the gelled polymer at a temperature of about 30° C. or less.

Still in another embodiment, the film of gelled polymer is formed at a temperature of about 5° C. or less relative to the temperature at which the polymer is dissolved in the solution.

Yet in another embodiment, the microporous polymer is produced by removing the liquid at a temperature of about 5° C. or less relative to the temperature at which the polymer is dissolved in the solution.

Yet another aspect of the present invention provides a substantially homogeneous solution comprising a dissolved polymer material and a high surface tension liquid, wherein the solubility of the polymer in the solution is about 20% v/v of solution or less. In one particular embodiment, the amount of polymer material dissolved in the solution is at least near its saturation limit.

Yet in another embodiment, the polymer material is selected from the group consisting of polyvinylidene fluoride, polyvinylidene fluoride-hexafluoropropylene copolymer, polyvinyl chloride, and a mixture thereof.

Microporous polymers of the present invention can be used in a wide variety of application. In one particular aspect of the present invention, the microporous polymer is prepared as a thin film such that it can be used as a battery separator. In this particular embodiment, the microporous polymeric thin film comprises:
  (a) a first surface adapted for operatively being connected to an anode;
  (b) a second surface adapted for operatively being connected to a cathode;
  (c) a bulk matrix between said first and second surfaces; and
  (d) a plurality of micropores extending from the first surface through the bulk matrix and to the second surface thereby providing a fluid communication between the anode and the cathode,
wherein the microporous polymeric thin film has a Gurley air permeability flow rate of about 4 seconds or less per mL of air flow per 25 microns of thickness per square inch of surface area.

In one embodiment, the microporous polymeric thin film has a porosity of at least about 75%. Preferably, the microporous polymeric thin film has a tensile strength of at least about 400 psi.

When the microporous polymeric thin film is used as a battery separator, its thickness typically ranges from about 1 μm to about 10,000 μm.

Generally, the average pore size of the microporous polymeric thin film battery separator is from about 0.05 μm to about 5000 μm, preferably from about 0.1 μm to about 100 μm, and more preferably from about 0.1 μm to about 10 μm.

Another aspect of the present invention provides a battery comprising
  (a) an anode;
  (b) a cathode; and
  (c) a microporous polymeric thin film separator positioned between the anode and the cathode, wherein the microporous polymeric thin film separator has a thickness in the range of from about 1 μm to about 10000 μm, and wherein the microporous polymeric thin film comprises:
    (i) a first surface;
    (ii) a second surface;
    (iii) a bulk matrix between the first and second surfaces; and
    (iii) a plurality of micropores extending from the first surface through the bulk matrix and to the second surface thereby providing a fluid communication between the anode and the cathode,
wherein the microporous polymeric thin film separator has a Gurley air permeability flow rate of about 4 seconds or less per mL of air flow per 25 microns of thickness per square inch of surface area.

Preferably, the microporous polymeric thin film separator is selected from the group consisting of:
polyvinylidene fluoride, polyethylene, polyvinyl chloride, polyacrylonitrile, polymethyl methacrylate, polyvinylidene fluoride-hexafluoropropylene copolymer, ethylene-acrylic acid copolymer, ethylene-styrene copolymer, styrene-butadiene copolymer, styrene-isoprene copolymer, polydiene, polyalkane, polyacrylic, polyvinyl ether, polyvinyl alcohol, polyacetal, polyvinyl ketone, polyvinyl halide, polyvinyl nitril, polyvinyl ester, polystyrene, polyphenylene, polyoxide, polycarbonate, polyester, polyanhydride, polyurethane, polysulfonate, polysulfide, polysulfone, polyamide, and a mixture of two or more thereof.

In one particular embodiment, the battery is a $NiMH_2$ battery, a NiH battery, a lithium rechargeable battery, a lithium primary battery, a lithium polymer battery, a NiCd battery, a lead-acid battery, an alkaline battery, or an air cathode battery. Still in another embodiment, the battery is a lithium ion battery.

Yet in another embodiment, the microporous polymeric thin film separator is positioned between the anode and the cathode surfaces that comprise electrochemically active powders to form a battery power source using an electrolyte as an ion transport medium. The electrochemically active powder of the cathode surface typically comprises a metal oxide component and the anode surface comprising a carbon-based component or optionally a metal oxide.

Preferably, the metal oxide component comprises lithium cobalt oxide ($LiCoO_2$), lithium nickel oxide ($LiNiO_2$), lithium manganese oxide ($LiMn_2O_4$), lithium nickel cobalt oxide ($LiNi_xCo_{1-x}O_2$), lithium phosphate compounds or a combination thereof.

Preferably, the carbon-based component comprises crystalline or amorphous carbonaceous materials in the form of fiber, powder, or microbeads including natural or synthetic graphite, carbon black, coke, mesocarbon microbeads, activated carbon or a combination thereof.

In one particular embodiment, at least one of the anode or the cathode is coated with an integral layer of microporous polymeric separator.

Yet in another embodiment, the microporous polymeric separator is bonded to at least one of the anode or the cathode.

Still another aspect of the present invention provides a filtration membrane comprising a microporous polymeric thin film, wherein said microporous polymeric thin film comprises:

(a) a first surface adapted for operatively being contacted with a first fluid media;
(b) a second surface adapted for operatively being connected with a second fluid media;
(c) a bulk matrix between said first and second surfaces; and
(d) a plurality of micropores extending from said first surface through said bulk matrix and to said second surface thereby providing a fluid communication between said anode and said cathode, wherein, the microporous polymeric thin film is that described herein.

Yet in another aspect, the present invention provides a fiber material comprising a microporous polymeric filament, wherein the microporous polymeric filaments comprise continuous or short staple fibers disposed as single fibers, stranded rovings, woven cloth and non-woven mats.

In another aspect of the present invention, a molding, panel, tube or similar structural element is provided that comprises a microporous polymeric bulk matrix material.

DETAILED DESCRIPTION OF THE INVENTION

Microporous Polymers

Conventional methods used to produce microporous polymers include extraction of plasticizers, mechanical stretching, phase inversion, leaching of dispersed fine particulates, and other similar techniques or combinations of techniques. These methods often require a series of complex steps and employ rather complicated formulations. However, none of the currently available methods provide microporous polymers having the desired high porosity characteristics.

In some applications, highly microporous polymers should have a sufficient strength (e.g., compression or tensile) and temperature resistance to withstand mechanical abuse and other stresses to meet the handling and service requirements for the intended application. These various requirements typically result in the need to make trade-offs between the ability of the polymers, especially polymer films, to provide separation between component systems or media while allowing transfer or throughput of other certain selective constituents of the process stream. For electrochemical devices the electrodes must be prevented from making direct contact (shorting), but allow passage of ions, fluids (such as water or gases) or other molecules. For use as a solid filter media, microporous polymers must be capable of trapping solids while allowing flow of fluids (liquids or gases) across the porous membrane.

As stated, some of the methods of the present invention provide highly microporous polymers while maintaining a fine pore structure. These materials are termed highly microporous polymers since the average pore size is about 10 µm or less in any given cross-sectional dimension. Typically, the average pore size of microporous polymers of the present invention is about 5 µm or less, preferably about 3 µm or less, and more preferably in the range of from about 2 µm to about 0.1 µm.

As the term implies, microporous polymers of the present invention contain pores, which extend from the first exterior surface into the bulk matrix and to the second exterior surface. The microporous polymers thus have pore surfaces, which are essentially the surfaces that surround and define the pores of the article. The pore surfaces can sometimes be referred to as the "interstitial surface" because they surround the interstitial volume (or voids) of the porous substrate.

It should be appreciated that formation of pores in polymers of the present invention is result of the process of producing the solid material from a solution of dissolved polymer material. Therefore, pores in polymers of the present invention are different from other porous materials where the pores are artificially or mechanically introduced, e.g., from those made by punching a series of small holes or small slits in close spacing to create a porous material or by combining or overlaying fine fibers or filaments that results in pores between unconsolidated, overlapping random arrays of fibers/filaments.

Unlike the materials where pores are artificially or mechanically introduced, pores in polymers of the present invention comprise tortuous channels that extend from the first surface to the second surface via the bulk matrix. Accordingly, polymers of the present invention have a relatively high tortuosity, e.g., the path length of the tortuous path through the pores exceeds the thickness of the film (direct path) by a factor of about at least 2 or higher. More often, the totuosity factor of pores in polymers of the present invention is at least about 2.5 or higher, preferably at least about 3 or higher. Tortuosity can be measured by a variety of techniques, e.g., MacMullin number which results in a value that is essentially a measure of the path length as a factor of the porosity of the material.

Some microporous polymers of the present invention have a tortuous pore structure with increased path length through the bulk matrix relative to the bulk matrix dimension. In some cases, the polymer's pore structure is disposed as a dispersed phase of thin membrane or filament network forming the pore interstitial surfaces without agglomerates, nodes of solids or other concentrated polymer structures within the bulk phase. Still in other instances, the polymer's pore structure has an average pore diameter size no greater than 25% of the bulk matrix thickness.

Typically, microporous polymers of the present invention have a porosity or void volume of at least about 75%, preferably at least about 80%, and more preferably at least about 85%. While some aspects of the present invention relates to highly microporous polymers, and methods for using and preparing the same, it should be appreciated that methods and processes of the present invention are not limited to producing highly microporous polymers. As such, methods and processes described herein for highly microporous polymers are only illustrative examples of only one aspect of the present invention. The porosity of the polymers produced by methods and processes described herein can vary depending on the variety of factors discussed herein. Thus, polymers of a wide range of porosity can be produced by methods and processes of the present invention depending on a particular need. Accordingly, in some instances the porosity of the polymer may be as low as 20 to 40%.

The amount of voids (i.e., pore volume or void volume) can be measured by a variety of techniques. For example, the pore volume of any porous material can be measured by an absorption method. In this method, the porous material is placed in an inert liquid of known density and the volume of liquid absorption by the material is determined. The percentage of pore volume in the material can be calculated or estimated by dividing the volume of liquid absorbed by the total theoretical volume of the non-porous material plus the volume of liquid absorbed, i.e.:

$$\text{pore volume} \approx (V_l)/(V_l+V_m).$$

where $V_l$=volume of liquid absorbed and $V_m$=volume of the material in a non-porous state. $V_m$ can be determined from the density of non-porous material and the weight of the porous material, i.e., $V_m$=M/$\delta$, where M is the weight of the porous material and $\delta$ is the density of a corresponding non-porous material, which are known for many polymers or can be easily determined by preparing a non-porous polymer from the same material.

The pore volume can also be determined by using the Archimedes' principle, which is well known to one skilled in the art. In its simplistic terms, the Archimedes' principle relies on the volume displacement of a liquid to determine the actual volume of the material. Thus, in this method $V_m$ is measured by Archimedes' principle and the other variable can be measured as described above.

Alternatively, it is standard in the battery separator industry to determine the battery separator's relative porosity through an air permeability test using a Gurley Densometer, e.g., 4340 (by Gurley Precision Instruments, Troy, N.Y.) or an analogous instrument. The Gurley Densometer forces air from one separator surface to the other surface at a fixed differential pressure and measures the time required to pass a certain volume of air per unit surface area of material. The air permeability is closely correlated to the ionic resistance of the separator in electrolyte and is used as a substitute measure.

In particular, the Gurley Densometer measures the porosity or air permeability of materials where air flow is an important characteristic relative to their use. The Gurley Densometer is applicable for testing any porous material, such as non-woven or woven textiles, filter and tissue papers, facial tissues, paper and cloth felts, some types of blotting, saturating and absorbent bag papers, wire meshes, as well as polymers. The Gurley Densometer is considered to be a standard instrument for measuring high levels of air-permeability or air-resistance as recommended in various test methods published by ASTM, TAPPI and ASA. For purposes of the present invention, the Gurley value (i.e., Gurley air permeability flow rate) is a measure of seconds per volume of air per thickness of the polymer per unit surface area of material. The microporous polymers of the present invention preferably have a Gurley value of less than 4 s/mL of air flow per 25 microns of microporous polymer thickness per square inch of material.

Another method for measuring the air permeability of material is illustrated in FIG. 1. The apparatus of FIG. 1 basically works by using a descending column of water to pull air through the porous material. First the column 10 is filled with water with the reservoir 20 in the upper position 24 and the sample 30, whose porosity is to be measured, is placed in the sample holder 34. Then the reservoir 20 is lowered to the lower position 28 and the water flows from the column 10 to the reservoir 20, thus pulling air through the sample. The time for a given volume of air to be pulled through a given area of the separator is measured. The time measured is corrected for the time it would take the water with no sample present and normalized for the thickness of the sample. This measurement gives a substantially similar value as that of the Gurley air flow rate.

For the sake of brevity, convenience and illustration, this detailed description of the invention will now be illustrated in reference to FIG. 1. It is to be understood, however, that the invention as a whole is not intended to be so limiting, and that one skilled in the art will recognize that the concept of the present invention will be applicable by the use of other appropriate apparatus which can be used to produce a porous composite material of the present invention in accordance with the techniques discussed herein. Such apparatuses suitable for use in the present invention will be readily apparent to those skilled in the art.

Methods of Preparation

Some aspects of the present invention provide simple and efficient formulas and processes for producing highly microporous polymers. The present invention utilizes a novel formula and processing means for creating voids in a polymer material.

Methods and processes of the present invention are illustrated herein in reference to producing highly microporous polymers for the sole purpose of brevity and convenience of illustration. It is to be understood that unless otherwise stated or the context requires otherwise, methods and processes of the present invention as a whole are not intended to be limited to production of only highly microporous polymers. In fact, one skilled in the art will readily recognize that the concept of a various methods and processes disclosed herein is applicable to producing polymers of a wide degree of porosity including semi-porous and non-porous polymers. Methods for producing polymers of different porosity will be readily apparent to those skilled in the art after having read the present disclosure.

Some methods of the present invention utilize liquids and polymer properties to produce a polymer solution which can form a stable gel phase. In some methods, the polymer material has a relatively broad range of solubility properties in the liquid over a relatively narrow range of polymer concentrations and temperatures. It is desirable that the dissolved polymer material go from being fully dissolved to a gel phase with only moderate to minimal operation, such as drying and/or cooling of the polymer solution. The gel phase can form spontaneously or through minimal processing operations. Once a gelled polymer is formed, the liquid is removed to produce a porous polymer. Thus, a stable but sometimes highly swelled polymer gel is formed initially from the polymer solution. Without being bound by any theory, it is believed that the preferred gelled polymer comprises a solid that is surrounded by high surface tension, non-wetting liquid. As conventionally described, the term "solvent" refers to a liquid that is used primarily to dissolve the polymer material, and the term "non-solvent" refers to a liquid that is believed to be responsible for the formation of micropores. However, it should be appreciated that a liquid as described herein can function both as a dissolving agent and pore former. Any liquid or combination of liquids that in essence functions as both a "solvent" and a "non-solvent" at different points within a narrow range of temperatures and compositions is particularly useful in the present invention.

It is believed that a gel phase occurs when a limited portion of the polymer material forms a precipitate or a solid phase. Usually this phenomenon is associated with semicrystalline polymers. These materials are typically characterized by having a portion of the molecular chains that are aligned or organized in a relatively orderly fashion over a limited region of the polymer molecules. The regions that remain in a disorganized fashion are termed amorphous. Often, the solubility of these crystalline and amorphous regions is sufficiently different that in certain specific liquids over a limited range of concentrations and temperatures, a two phase system is produced. The crystalline regions form a solid-like, structural network and the amorphous polymer regions remain in solution as a liquid. It is believed that removal of the liquid from the amorphous regions without significantly collapsing the gel or crystalline phase yields the desired polymer.

It is desirable to remove the liquid from the gel phase without excessive shrinkage of the gel and/or collapse of the pore structure. For example, in some cases the amorphous phase within the polymer gel can have over 90% volume of liquid and less than 10% solids content. By removing the liquid in a controlled manner, the pore volume of the resulting porous polymer is preserved at nearly the full volume previously occupied by the liquid (i.e., 90% voids after complete drying of all liquids).

Typically, polymers of the present invention are produced by forming a layer of a polymer solution on a substrate. The polymer solution comprises a liquid and a polymer material that is dissolved in the liquid. Liquid can include a low surface tension liquid and/or a high surface tension liquid. The "high surface tension liquid" refers to a liquid that has a surface tension higher than the surface energy of the solid polymer material. Similar, a "low surface tension liquid" refers to a liquid that has a surface tension lower than the surface energy of the solid polymer material.

A high surface tension liquid can serve as the sole liquid component in the polymer solution. The liquid portion of the solution need not, but can also include a low surface tension liquid. When both a high surface tension liquid and a low surface tension liquid are present in the polymer solution, it is desirable that the high surface tension liquid has a lower volatility, e.g., lower vapor pressure, than the low surface tension liquid such that a sufficient amount of the high surface tension liquid remains in the solution subsequent to any removal, e.g., via evaporation or other means, of an accompanying low surface tension liquid to form the gel phase. After the gel phase has formed, the remaining high surface tension liquid can be removed to form the porous polymer. Typically, the high surface tension liquid is removed from the gel phase by direct air drying or other simple method such as suction, blotting, surface rinsing, etc. without the need for liquid extraction, high vacuum, heat or other complex steps.

When both the high surface tension liquid and the low surface tension liquid are present in the polymer solution, the ratio of the low surface tension liquid relative to the high surface tension liquid is generally about 99:1 v/v or less, and typically about 9:1 v/v or less.

Typically, the high surface tension liquid has a surface tension of about 35 dynes/cm or greater at 25° C., preferably at least about 40 dynes/cm, and more preferably at least about 50 dynes/cm. Exemplary high surface tension liquids include acetamide, acetophenone, adiponitrile, aniline, benzaldehyde, benzyl benzoate, benzonitrile, benzophenone, bromine, bromobenzene, tribromomethane, bromophenol, carbon disulfide, chloroacetic acid, chlorobenzene, chlorophenol, diethylaniline, diethylene glycol, dimethylaniline, dimethyl phenyl pyrazolane, dimethyl sulfoxide, diphenylamine, ethylaniline, ethylene bromide, ethylene glycol, formamide, formic acid, furfural, γ-butyrolactone, glycerin, glycerol, methylaniline, methyl benzoate, methylene iodide, nitric acid, nitrobenzene, nitromethane, phenol, phosphorous tribromide, phosphorous tri-iodide, propylene glycol, pyridine, pyridazine, quinoline, sulfuric acid, tetrabromomethane, toluene, xylene, and water. In some methods of the present invention water is used as the high surface tension liquid.

Examples of low surface tension liquids include ketones, esters, ethers, aldehydes, organic nitrogen compounds, organic sulfur compounds, and a mixture of two or more thereof. Typically, the ketone is selected from the group consisting of acetone, methyl ethyl ketone, pentanone, hexanone, a cyclic ketone, and a mixture of two or more thereof.

The composition of the liquid in the polymer solution is generally selected such that the polymer material has a limited solubility in the liquid. Typically, the solubility of the polymer material in the liquid is about 25% v/v or less. In some cases, the solubility of the polymer material in the liquid is about 10% v/v or less. No matter what the polymer material solubility is, some methods of the present invention use a polymer solution where the amount of dissolved polymer material in the polymer solution is near or above its saturation point. This allows a quicker gel formation, thereby reducing the overall production time.

Polymers of the present invention are organic polymers; therefore, the composition of polymers of the present invention comprises carbon and hydrogen, halogen, oxygen, nitrogen, and/or sulfur. Some of the polymers of the present invention comprise carbon and halogen, such as chloride and/or fluoride. A particular example of useful polymer materials include polyvinylidene fluoride, polyethylene, polyvinyl chloride, polyacrylonitrile, polymethyl methacrylate, polyvinylidene fluoride-hexafluoropropylene copolymer, ethylene-acrylic acid copolymer, ethylene-styrene copolymer, styrene-butadiene copolymer, styrene-isoprene copolymer, polydiene, polyalkane, polyacrylic, polyvinyl ether, polyvinyl alcohol, polyacetal, polyvinyl ketone, polyvinyl halide, polyvinyl nitril, polyvinyl ester, polystyrene, polyphenylene, polyoxide, polycarbonate, polyester, polyanhydride, polyurethane, polysulfonate, polysulfide, polysulfone, polyamide, and a mixture thereof.

One particularly useful polymer material includes polyvinylidene fluoride, polylvinylidene fluoride-hexafluoropropylene copolymer, and/or polyvinyl chloride. Some copolymers of the present invention comprise at least about 80% polyvinylidene fluoride.

The polymer material can be a homopolymer or a co-polymer of two or more different polymer materials. Whether a homopolymer or a co-polymer is used, it is desirable that the dissolved polymer material is able to form a semi-crystalline solid. As used herein, the term "semi-crystalline" refers to a solid material that includes a mixture of a crystalline phase and an amorphous phase as known by those skilled in the art. Thus, a semi-crystalline polymer can be a single component polymer or a mixture of crystalline and amorphous polymers.

Preferably, the substrate, on which the layer of polymer solution is placed, has a high surface free energy. Without being bound by any theory, using a high surface free energy substrate reduces or eliminates incidences of the porous polymer from coalescing on the substrate. It is intended that the scope of the present invention includes both forming a porous polymer independent of the substrate as well as substrates that form more highly dispersed micropores with the porous polymer of the present invention.

Typically, the surface free energy of the substrate that is used to produce polymers of the present invention has a surface free energy of about 35 dynes/cm or greater at 25° C., preferably at least about 40 dynes/cm, and more preferably at least about 50 dynes/cm. Exemplary high surface free energy substrates include glass and metals, such as aluminum, steel, copper, gold, silver, etc.

It is desirable to form a gelled polymer under conditions sufficient to provide a non-wetting, high surface tension solution. The term "non-wetting" refers to conditions where a substantial amount of previously dissolved or solvated solid material is precipitated in a high surface tension (i.e., non-wetting) liquid. Non-wetting liquid compositions and/or conditions can be readily determined by placing the liquid composition on a film of the solid polymer material and measuring the contact angle between the liquid and the solid. Non-wetting liquids will not spread on a solid surface of higher surface free energy and will form beads of liquid. Alternatively, to those skilled in the art, direct surface tension measurements can be made by measuring the force to spread a given amount of liquid on the solid. Generally, if the liquid beads on the surface of the solid material, it is considered to be a non-wetting, high surface tension liquid, and if the liquid spreads on the solid material surface, the liquid is considered to be a wetting, low surface tension liquid. An exemplary procedure for determining wetting characteristics of microporous polymer materials is described in U.S. Pat. No. 5,318,866, which is incorporated herein by reference in its entirety.

The gelled polymer is formed at a temperature below the boiling temperature of the solution or below the melt temperature of the polymer material, whichever is lower. Typically, the gelled polymer is formed at a temperature of about 40° C. or less. It should be appreciated that the polymer material can be dissolved in the liquid by heating and/or by high shear mixing. Whatever the temperature that is used in forming a substantially homogenous polymer solution, it is desirable to form the gelled polymer at a temperature of about 5° C. or less relative to the dissolution and wetting temperature of the polymer material. Often the gelled polymer is formed by placing the polymer solution on to a substrate that is at a lower temperature than the polymer solution. Alternatively, after placing the polymer solution on to a substrate, the polymer solution can be cooled to form a gelled polymer. In addition, or alternatively, a gelled polymer can be formed from the polymer solution layer by removing at least a portion of the liquid, e.g., by evaporation which can be aided by blowing a gas over the polymer solution layer or by vacuum.

As stated above, after the gelled polymer has formed the remaining liquid can be removed to form the porous polymer. Typically, the liquid is removed from the gel phase by direct air drying, vacuum, or other simple methods. Often the polymer drying temperature is at or below the gelled polymer formation temperature. Typically, the liquid from the gelled polymer is removed at a temperature of about 30° C. or less, or at a temperature of about 5° C. or less relative to the dissolution and wetting temperature of the polymer material. Preferably, upon drying of the gelled polymer the film does not significantly shrink or lose its porosity.

Utility

Some polymers of the present invention are generally highly porous. Processes of the present invention can be used to produce porous polymers having a suitable void content, pore size and tortuosity of the pores that are sufficient to prevent or substantially reduce undesirable passage of particulates or other materials through the pores but adequate to allow communication of fluids through the polymer.

In addition, methods of the present invention can be used to produce a strong polymer film that is highly porous with fine diameter complex pore geometry. Polymers of other mechanical and/or physical properties can be produced by methods of the present invention by the selection of a polymer solution system that combines the proper type of solution parameters with a specific type of polymer molecular structure.

Polymers of the present invention can be used in electrochemical devices (such as battery separators, capacitor separators, electrode binder materials, sensors, etc.), and as filtration materials (for example in separating gases, ions, and/or liquids), fabrics, mats, cloth, fibers (including hollow fibers), structural foams, as well as other applications that are well known to one skilled in the art, and other areas where polymers are used.

Methods of the present invention provide a wide range of polymer thickness depending on the desired application of the polymer. For the sake of brevity and for illustrative purposes only, the utility and/or the thickness of polymers of the present invention will now be described in reference to a battery separator.

Batteries have an anode and a cathode that is separated by a separator (i.e., battery separator). The principal function of the battery separator is to prevent physical contact and electrical conduction (i.e., "shorts") between the anode and the cathode while permitting ionic conduction via the electrolyte. The pores of the separator are filled with an ionically conductive electrolyte or allow migration of fluid from one electrode to another. Since the pores of battery separators are conduits of power, batteries having high porosity separator(s) provide a higher battery power and/or a longer battery life. In some cases, battery separators also need to provide good mechanical properties, e.g., in dry batteries, for winding and low electrical resistivity for device performance.

Some of the microporous polymers of the present invention have a porosity that is substantially higher than that of conventional battery separators. This makes highly microporous polymers of the present invention especially useful as separators for high power batteries. The thickness of microporous polymers of the present invention can vary depending on the method of fabrication. For use as a battery separator, the thickness of the highly microporous polymer of the present invention is about 5 mm or less. In some instances, the highly microporous polymer of the present invention is produced as a thin film, often having the thickness of about 100 µm or less or preferably for lithium batteries, 25 micron or less.

Some applications require a highly porous polymer with a good mechanical strength. Methods of the present invention provide highly porous polymers having the tensile strength of at least about 100 psi as well as those having the tensile strength of at least about 400 psi.

Additional objects, advantages, and novel features of this invention will become apparent to those skilled in the art upon examination of the following examples thereof, which are not intended to be limiting.

EXAMPLES

General Procedures

A mixture of 95% acetone, 3% polymer (AtoChem PVDF-HFP 2801), 2% water (all amounts by weight %) was heated to about 40° C. with high shear mixing until all the polymer material dissolved. The resulting solution was cooled carefully to about 25° C. to 35° C. to avoid any gel formation. The solution was then coated onto glass or smooth metal foil substrates at ambient temperature to yield about 500 micron of solution film thickness.

The film was further solidified/dried into final configuration by natural convection or forced air drying at a temperature of about 25° C. The dried polymer was removed from the substrate. Wetting with a low surface tension liquid such as methanol can be used if necessary to break adhesion of polymer to glass. The film was further dried prior to use in lithium cells (i.e., vacuum oven drying of solidified films at <50° C. for 16 hr).

Polymer films can also be coated in a similar manner onto lithium ion cell anodes and cathodes as desired to form an integral, bonded separator layer directly on the electrodes.

Preliminary Lab Evaluations of Baseline Technology:

Several microporous polymer films were prepared using both the single PVDF-HFP copolymer material as well as with blends of multiple PVDF grades and liquids. These samples were produced as described above using water as the high surface tension liquid. The table below provides the details for these samples.

| Formulation | Test Sample Data for Density and Porosity Calculation | | | | | |
|---|---|---|---|---|---|---|
| | w (cm) | l (cm) | t (μm) | wt. (g) | δ (g/mL) | % porosity |
| 3% PVDF 2801; 2% water; 95% acetone | 12 | 24 | 19 | 0.38 | 0.69 | 85 |
| same as above (except coated on ethylene glycol release agent) | 15 | 29 | 19 | 0.47 | 0.57 | 90 |
| 2.3% PVDF 2801, 1.5% PVDF 301F, 0.75% PVDF 761, 6.9% MEK, 78.2% acetone, 6.9% dioxolane, 3.4% water | 13 | 16 | 25 | 0.23 | 0.44 | 87.5 | w = width;
l = length;
t = thickness (slightly compressed);
wt = dry weight;
δ = density The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are dis closed herein, and without intending to publicly dedicate any patentable subject matter.

What is claimed is:

1. A method of producing a microporous polymer film comprising:
   dissolving a polymer having a polymer free surface energy in a low surface tension liquid to form a polymer solution;
   forming an approximately saturated solution by adding, to the polymer solution, a high surface tension liquid having a surface tension equal to or in excess of the polymer surface free energy; the forming being conducted at a temperature less than or equal to the lower of a boiling temperature of the approximately saturated solution or a melt temperature of the polymer;
   placing the approximately saturated solution in a layer at the forming temperature on a generally planar substrate having a substrate surface free energy at least equal to the surface tension of the low surface tension liquid;
   urging the low surface tension liquid into a non-wetting relation to the polymer by cooling the approximately saturated solution to increase surface tension of the solvent to form a gelled polymer having a surface tension which exceeds the surface free energy of the polymer material, causing the low surface tension liquid to tend to bead within the gelled polymer; and
   evaporating the low surface tension liquid from the gelled polymer to form a film defining a plurality of pores, such that sufficient low surface tension liquid is partially removed from the gelled polymer to form the film defining the plurality of pores, the low surface tension liquid being evaporated at temperatures not to exceed the lower of a boiling temperature of the approximately saturated solution and of the melt temperature of the polymer.

2. The method of claim 1, wherein the solubility of the polymer material in the solution is about 25% v/v or less relative to the total volume of the solvent in the solution.

3. The method of claim 1, wherein the ratio of the low surface tension liquid relative to the high surface tension liquid is less than or equal to between 9:1 to 99:1 v/v.

4. The method of claim 1, wherein
   the volume of the high surface tension liquid is selected in a ratio to the polymer material to approximate a desired void volume ratio between the a volume of the plurality of pores and the combined total volume of the polymer material and the volume of the plurality of pores.

5. The method of claim 1, wherein the low surface tension liquid is one of a group of a ketone, ester, ether, aldehyde, amine, amide, nitrile, cyanate, nitrite, nitrate, nitro- or nitroso-compound, thiol, sulfide, sulfonium, sulfate, sulfonyl compound, sulfinyl compound, thio-compounds, and a mixture of two or more thereof.

6. The method of claim 5, wherein the ketone is selected from a group consisting of acetone, methyl ethyl ketone, pentanone, hexanone, cyclic ketone, and a mixture of two or more thereof.

7. The method of claim 1, wherein the high surface tension liquid is selected from a group consisting of:
acetamide, acetophenone, adiponitrile, aniline, benzaldehyde, benzyl benzoate, benzonitrile, benzophenone, bromine, bromobenzene, tribromomethane, bromophenol, carbon disulfide, chloroacetic acid, chlorobenzene, chlorophenol, diethylaniline, diethylene glycol, dimethylaniline, dimethyl phenyl pyrazolane, dimethyl sulfoxide, diphenylamine, ethylaniline, ethylene bromide, ethylene glycol, formamide, formic acid, furfural, γ-butyrolactone, glycerin, glycerol, methylaniline, methyl benzoate, methylene iodide, nitric acid, nitrobenzene, nitromethane, phenol, phosphorous tribromide, phosphorous tri-iodide, propylene glycol, pyridine, pyridazine, quinoline, sulfuric acid, tetrabromomethane, toluene, xylene, water, and a mixture of two or more thereof.

8. The method of claim 7, wherein the high surface tension liquid is water.

9. The method of claim 1, wherein the thickness of the layer is about 500 μm or less.

10. The method of claim 1, wherein the surface tension of the solvent is at least about 35 dynes/cm at 25° C.

11. The method of claim 1, wherein the gelled polymer is formed at a temperature of about 40° C. or less.

12. The method of claim 11, wherein the low surface tension liquid is removed from the gelled polymer at a temperature of about 30° C. or less.

13. The method of claim 1, wherein the gelled polymer is formed at a temperature of about 5° C. or less relative to forming temperature of the approximately saturated solution.

14. The method of claim 1, wherein the solvent is removed at a temperature of about 5° C. or less relative to the forming temperature of the approximately saturated solution.

15. The method of claim 1, wherein the solubility of the polymer material in the low surface tension liquid is about 10% v/v or less.

16. The method of claim 1, the forming the approximately saturated solution-includes one of heating the mixture, subjecting the mixture to high shear mixing, or a combination thereof

* * * * *